United States Patent [19]

Nausedas

[11] Patent Number: 4,570,300
[45] Date of Patent: Feb. 18, 1986

[54] CASING ARTICLE

[75] Inventor: Joseph A. Nausedas, Oak Forest, Ill.

[73] Assignee: Union Carbide Corporation, Danbury, Conn.

[21] Appl. No.: 583,317

[22] Filed: Feb. 24, 1984

[51] Int. Cl.⁴ .................. A22L 11/10; A22L 11/02
[52] U.S. Cl. ............................ 17/49; 17/33; 17/1 F
[58] Field of Search ........... 17/1 R, 1 F, 33, 35–42, 17/49; 53/576

[56] References Cited

U.S. PATENT DOCUMENTS

| | | | |
|---|---|---|---|
| 1,302,194 | 4/1919 | Mayer | 17/33 |
| 2,168,693 | 8/1939 | Walter | 17/33 |
| 3,115,668 | 12/1963 | Townsend | 17/33 |
| 3,826,852 | 7/1974 | Levaco et al. | 426/132 |
| 3,835,503 | 9/1974 | Townsend et al. | 17/35 |
| 3,949,446 | 4/1976 | Smith | 17/41 |
| 4,187,583 | 2/1980 | Townsend et al. | 17/49 |
| 4,437,209 | 3/1984 | Duroyan | 17/49 |
| 4,480,426 | 11/1984 | Wach et al. | 17/49 |

FOREIGN PATENT DOCUMENTS 1167377  10/1969  United Kingdom .

Primary Examiner—James M. Meister
Assistant Examiner—John L. Knoble
Attorney, Agent, or Firm—Roger Aceto

[57] ABSTRACT

A casing article for use in automatic production of frankfurters and the like includes a tubular core and a shirred casing strand mounted to the core. The core can function as a disposable stuffing horn or it can be placed over a stuffing horn. When used as a stuffing horn, the core has one end receivable in the discharge of the stuffing machine and a second end including a flange which is engaged and rotated by a rotation chuck of the stuffing apparatus.

21 Claims, 8 Drawing Figures

CASING ARTICLE

BACKGROUND OF THE INVENTION

The present invention relates generally to a casing article and, more particularly, to a cored casing article and to apparatus adapted to utilize the article in a stuffing operation.

Tubular casing articles and apparatus, as may be used for the high speed automatic production of encased food products, such as frankfurters or the like, are well known in the art. Such automatic high speed production requires that relatively long lengths of casing be supplied to the stuffing apparatus. It is conventional to supply the casing in the form of a compacted shirred tubular casing article called a "shirred stick." It is not uncommon for a shirred stick measuring 20 inches in length to contain upwards of 160 feet or more of casing. The sticks, which are coherent and resistant to breakage, can be handled by the mechanical loading apparatus of a stuffing machine. Conventional apparatus for stuffing and linking this entire casing length in less than a minute is also known in the art, one such apparatus being described in U.S. Pat. No. 3,115,668.

Briefly, in the operation of apparatus as described in the '668 patent, a shirred casing stick is automatically brought into axial alignment with the longitudinal axis of the stuffing horn of the stuffing machine. The stuffing horn then is moved axially through the bore of the shirred stick. This mounts the stick on the stuffing horn and locates the discharge end of the stuffing horn adjacent a fore end of the stick.

The fore end of the shirred casing stick then is engaged by a rotating chuck which spins the stick about the longitudinal axis of the stuffing horn. Food product, usually in the form of an emulsion, passes through the non-rotating stuffing horn and is discharged into the spinning casing to form the encased product. The encased product, which is also spinning, passes longitudinally through the rotating chuck to a linking mechanism.

The improved casing article of the present invention includes a substantially rigid tubular core member disposed within the bore of the casing stick. It is sufficient for purposes of the present invention that the inner periphery of the casing stick be in contact about the outer periphery of the tubular core, preferably over the full length of the casing stick. Moreover, this contact should be sufficient to provide a resistance to relative motion between the core and the casing stick. The core also should have as thin a wall as possible, yet be able to withstand the stresses generated by the casing being in contact about the core. In other words, the tubular core must not be so thin walled or weak as to buckle under the casing generated stresses.

Various advantages are exhibited by cored casing articles. For example a cored casing article has a greater coherency, that is a greater ability to resist breaking than a conventional shirred casing stick which does not have a tubular core member. Resistance to breaking renders the casing article better able to resist the rigors of manual handling and of automatic handling by the stuffing apparatus.

Another advantage is that due to the physical support offered by the core, a cored artical can contain a greater length of casing than an uncored article. This is a very desirable feature in automatic stuffing opertions since greater casing lengths translate to faster production and less machine downtime while a new casing article is being loaded into stuffing position.

Also, with longer casings there are fewer casing ends to deal with. This reduces labor involved in both tying stuffed casing lengths together for subsequent processing, and in removing food product from any malformed end links.

In any event, for purposes of the present invention, the shirred stick on the core is characterized as being in contact about the outer periphery of the core over substantially the full length of the stick. This contact provides a resistance to relative motion between the core and shirred stick which is sufficient to maintain the strand fixed to the core as the core rotates and as casing is deshirred from the strand.

All of these advantages obtain when using a cored casing article with a conventional stuffing horn. However, the cored casing article provides an additional advantage in that the core itself can function as a stuffing horn and in particular as a disposable, one-use stuffing horn. Here, the core would have an aft end attachable to the discharge of the stuffing machine and a fore end from which the food product exits for introduction into the casing.

In order to have the tubular core of the casing article replace the more conventional stuffing horn of the type shown in the '668 patent, both the casing article and the stuffing apparatus must be modified in several aspects. For example, the fore end of the tubular core and the rotating chuck of the stuffing machine must be compatible in that the chuck must be able to engage the fore end to rotate the core about a longitudinal axis. This enables the linking apparatus of the stuffing machine to function in a conventional manner.

Further, the discharge of the stuffing machine must be able to rotatably accommodate the aft end of the tubular core. Also, the discharge must include a seal means which prevents the leakage of the food product from the discharge and about the rotating core as the food product is introduced through the core and into the casing carried by the core.

Accordingly, in one embodiment, the apparatus of the present invention is provided with components which interface with a cored casing article to permit the core to function as the stuffing horn of the apparatus. In another embodiment the appartus has a conventional stuffing horn and is provided with the components needed to rotate the cored casing article about the stuffing horn.

These and other advantages, objects, and characterizing features of the present invention will become more apparent upon a consideration of the following detailed description thereof, which is directed to a cored casing article having an improved core configuration to permit its use by an automatic stuffing machine, together with an improved rotating chuck assembly and discharge configuration for the machine to permit utilization of the improved cored article.

SUMMARY OF THE INVENTION

The casing article core of the present invention may be characterized in one aspect thereof by an elongated substantially rigid tubular core for supporting a tubular shirred casing stick, wherein the core includes drivable means on its fore end for driving engagement by a rotational force. In one embodiment, the drivable means is a flange which is oriented in a plane generally perpendicular to the longitudinal axis of the core. The flange has a size sufficient to permit the deshirring over the flange of the casing carried by the core, and a shape which permits coupling of the flange to a rotating drive so casing passes between the flange and the drive. The flange can be a circular member having peripheral portions which are bent so as to provide the flange with flat surfaces for coupling to the rotating drive.

The cored casing article of the present invention includes a shirred casing stick on the core wherein the core and casing are in sufficient contact to provide a resistance to relative motion therebetween so that rotation of the core will also rotate the casing. A portion of the casing is deshirred over the engaging means on the fore end of the core and twisted to close the end of the casing.

The apparatus described herein for using the casing article of the present invention has a seal means at a dishcarge of the stuffing apparatus which is adapted to releasably receive an aft end of a rotating rigid tubular member and which places the tubular member in communication with the discharge so that food product passes directly into and through the tubular member and into the casing carried by the tubular member. The machine also includes a rotating chuck which is spaced from, and in axial alignment with, the seal means at the discharge. The chuck has a central opening to receive filled casing passing from the fore end of the tubular member. In addition, the chuck has a plurality of drive components spaced about the chuck opening and positioned to receive the fore end of the tubular member for spinning the tubular member about its longitudinal axis, the drive components including antifriction means arranged to permit the longitudinal passage of casing from the tubular member and over the drive components into the chuck opening.

The casing article of the present invention can also be used with stuffing apparatus having a more conventional stuffing horn which extends through the core of the casing article. In such cases, the apparatus would be modified as described herein to accommodate driving the core at its fore end.

DESCRIPTION OF THE DRAWINGS

FIG. 3 is a diagramatic view showing operation of a typical stuffing machine as may be used in manufacture of frankfurters and the like;

DESCRIPTION OF THE PREFERRED EMBODIMENTS

Figure 1C:
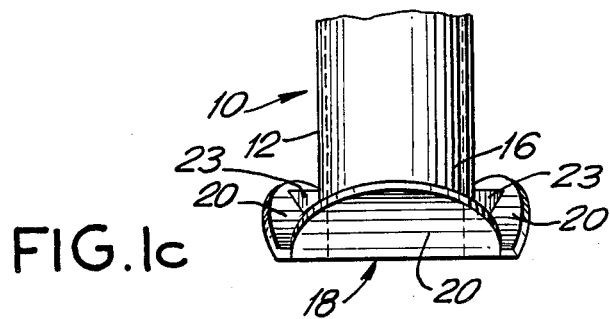
FIGS. 1 a, 1 b and 1 c are respectively side, front and top views of the improved core member utilized in the present invention.
Figure 1A:
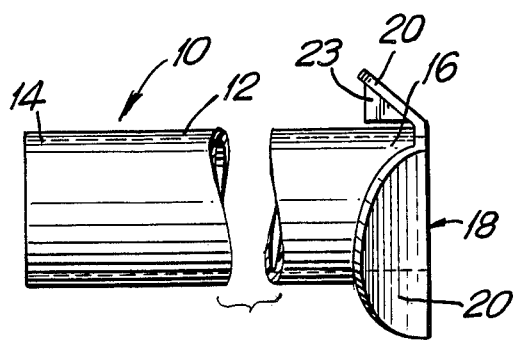

Referring to the drawings, FIG. 1 shows the tubular core 10 of the present invention which may be placed over a conventional stuffing horn or which may function as a disposable stuffing horn of a stuffing machine. The core consists of an elongated tubular body 12 and has an aft end 14 and a fore end 16. The core is preferably made of a relatively inexpensive material having a high creep strength such as polyvinylchloride which lends itself to the fabrication of disposable, single use items.

On the fore end 16 of core 10 is a drivable means 18. The drivable means comprises a flange oriented in a plane generally perpendicular to the longitudinal axis of the core and the periphery of the flange includes a plurality of flats 20 which are bent rearward over tubular body 12 in a direction towards aft end 14.

Figure 1B:
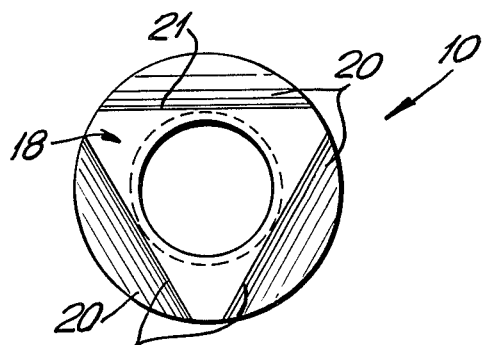

As best seen in FIG. 1b, the projection of the flange is a circle. Preferably, the diameter of the flange is substantially equal to the inflated inside diameter of the casing to be carried by the core. This allows the flange to function as an emulsion seal, wherein the periphery of the flange would bear tightly against the inner periphery of the casing passing over the flange.

The flats 20 at the periphery of the flange are defined by cords of equal length as indicated at 21, each flat 20 being bent rearward along these cords. Flats 20 preferably are equally spaced about the periphery of the disc and are three in number as shown in FIG. 1b.

While the flange as shown in FIG. 1 has three flats as defined by cord lengths 21, it should be appreciated that for purposes of the present invention the flange may be formed with any convenient number of such flats.

As will be described hereinbelow, these flats 20 provide bearing surfaces which are engaged by the rotating chuck of the stuffing machine for rotating the core. In this context, then, other possible shapes or configurations of the engagement means or flange 18 which would compliment the shape of a drive chuck would be readily apparent to one skilled in the art.

It is preferred that the flats 20 be somewhat resilient in order to flex about the chord 21. This ability to flex provides a "soft" engagement of the flange against the drive chuck as the flange and chuck are moved into engagement. Each flat carries a stop 23 on its undersurface which limits the extent of the flexing by butting against the surface of the tubular body 12.

Figure 2:
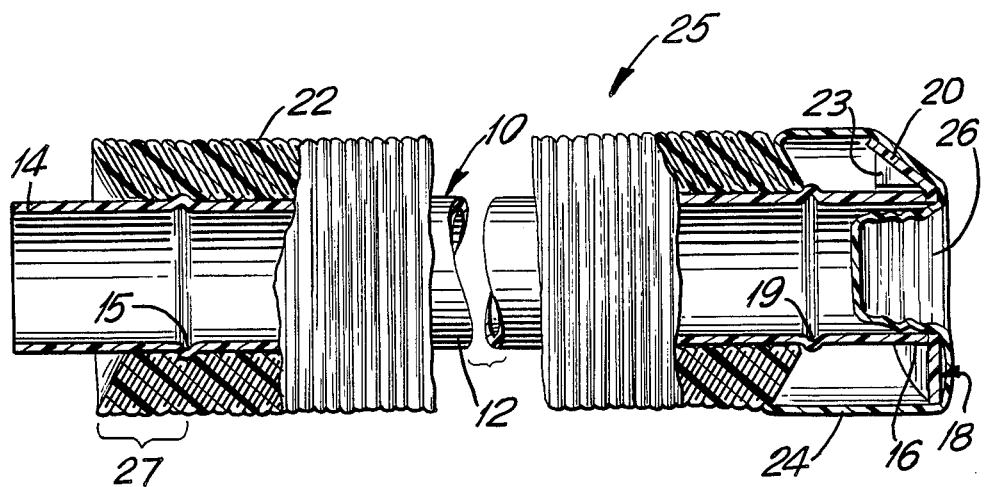
FIG. 2 is a side elevation view partly broken away and in section, showing the improved cored casing article of the present invention.

Referring to FIG. 2, there is shown a casing article generally indicated at 25, utilizing the core 10 of FIG. 1. In this respect, the core of FIG. 1 is shown as carrying a supply of casing in the form of a shirred stick 22.

Techniques for forming shirred stick 22 are well known in the art and will not be described in detail. It is sufficient for purposes of the present invention merely to say that it involves a shirring process wherein a relatively long length of casing is shirred about a mandrel by any one of several conventional techniques to produce a relatively short shirred stick.

Still further length reduction is accomplished by subjecting the shirred stick to an axial force so as to compact the pleats formed by shirring. The end result is that is not uncommon in the art to have a shirred stick which is only about 1% of the length of the unshirred casing, that is, a shirred stick 22 measuring one foot in length may contain 70 to 100 or more feet of casing.

Typically, one size of casing used in the manufacture of frankfurters or the like has an inflated diameter of between about 0.73 inches to about 0.83 inches and a wall thickness of about 0.001 inches. Lengths of up to 160 feet of such casing would be shirred and compacted to form a stick having a length measuring about 20 inches and a bore diameter of between about 0.416 and 0.500 inches.

A shirred stick is resilient and is known to expand both longitudinally and radially inward when removed from the shirring machine. This is especially true for shirred sticks which undergo a subsequent compaction step. For this reason a shirred stick which is made and then transferred to a core should have a slightly larger inside diameter then the outside diameter of tubular body 12 in order to accommodate this radial inward expansion. After the transfer to the core, the shirred stick will expand radially inward so that the inner peripheral surface of the stick engages and contacts about the outer peripheral surface of the core.

The contact and engagement of the casing about the core should be sufficient to resist relative motion between the shirred stick and core. This will permit the stick to spin with the core. That is, any rotation of the core about its longitudinal axis should result in a like rotation of the shirred stick so that the entire casing article 25 can rotate as a unit.

In the article as shown in FIG. 2, the shirred stick is arranged so that the last pleats of casing shirred, that is those adjacent fore end 16, are the first to deshirr when the casing is stuffed. This is the opposite of more conventional stuffing techniques wherein the first casing shirred is also the first casing to be deshirred. The reason for this opposite convention when using cored articles of the type described herein, is that it permits pleats to deshirr without the possibility of tearing any pleats which may be pinched to the core by adjacent pleats in the stick.

In any event, after the shirred stick is disposed on the tubular body 12 of the core, a portion of the casing adjacent the fore end of the tubular core is deshirred as shown at 24 and pulled forward over flange 18. This deshirred portion of casing is formed into an end closure 26 which is used to plug the bore opening of the tubular core. Such end closures for uncored articles and the method and apparatus for effecting such an end closure are well known in the art and may be readily adapted for use with cored articles of the type described herein.

FIG. 2 also shows the tubular body 12 as having a raised rib 15 formed adjacent its aft end 14. This rib preferably is formed after shirred stick 22 is in place on the fore. The function of rib 15 is to insure that an anchor portion 27 of the casing which is located aft of the rib 15 remains fixed to the core until all of the casing forward of the rib has deshirred from the stick.

It should be apparent that as casing deshirrs from the stick, the stick gets shorter. As the stick gets shorter, the resistance to relative motion between the core and remaining portion of the stick decreases. It is likely, that at some point, the resistance to relative motion, as provided by the contact between the core and remaining portion of the stick, will be less than the force required to deshirr casing from the stick. When this happens the remaining portion of the stick will break free of the core and begin to move longitudinally along the core towards the fore end 16 responsive to the deshirring force.

The longitudinal movement of this remaining portion of the stick could prematurely initiate termination of the stuffing operation. Consequently, rib 15 provides a barrier to delay any longitudinal movement of the anchor portion 27 of the stick along the core until after all of the casing forward of this rib has been deshirred from the stick.

Preferably a second raised rib 19 is formed adjacent the fore end of the core. this rib 19 is positioned ahead of the shirred stick and functions to prevent a slug of the shirred stick from moving along the core and against flange 18 responsive to the force applied to deshirr from the stick.

In a preferred embodiment, casing article 25 will include features of a so called "cored high density" article. Cored high density articles per se are subject of a copending application Ser. No. 363,851. By way of illustrating a preferred embodiment of the present invention, an example of a preferred casing article, including cored high density features and its method of manufacture, is described hereinbelow.

Briefly, one feature of a cored high density article is that it contains a longer than conventional length of casing which after shirring, is more highly compacted than conventional, uncored casing articles. The high degree of compaction considerably increases the forces exerted on the core due to the inherent resiliency of the highly compacted casing.

Production of a casing article 25 having cored high density features may begin with a conventional shirring step wherein a conventional cellulosic casing, as maybe used in the manufacture of frankfurters, is shirred on the mandrel of a shirring machine in a conventional manner by any one fo several shirring techniques. A preferred shirring method is disclosed in U.S. Pat. No. 3,779,284. Typical cellulosic casings of this type may have a stuffed diameter of about 0.81 inches, a wall thickness of about 0.001 inches and a moisture content of between about 12-16% and preferably, at least about 13% by weight.

A conventional shirred stick, of such casing might contain about 160 feet of casing. For purposes of the present invention, it is preferred that the shirred stick contain about 250-285 feet of casing.

After shirring, the stick undergoes a compaction step which further reduces its length. Compaction methods are known and, in general, involve placing the shirred stick on a mandrel having a desired outside diameter, and then moving a compaction arm against one end of the stick to compress it up against a restraint. This compacts the stick while maintaining a desired bore size.

In a preferred compaction method, as disclosed in a copending application Ser. No. 436,057, compaction arms are simultaneously moved against both ends of the shirred stick to simultaneously move and compress both ends of the stick towards the middle. This method was found to facilitate compaction and to permit a relatively high degree of compaction with a relatively low compaction force.

Compaction of 285 feet of casing to a length measuring about 19 inches results in a pack ratio of about 180. "Pack Ratio" is a term of art and is simply the unshirred casing length is in inches divided by the final compacted length in inches.

After compaction, the shirred stick is doffed from the mandrel and onto the tubular core 10 of the casing article.

It is well known that a shirred stick is resilient and will begin to expand axially as soon as the compressive forces are relaxed and restraints on the compacted casing are relieved. The bore of the shirred stick will also begin to grow smaller in diameter as the stick expands radially inward into the volume previously occupied by the mandrel. Accordingly, the core must have a high creep strength to resist the forces generated by the resilient shirred stick.

Also, to facilitate transfer of the shirred stick to the core, the outside diameter of the core should be slightly less than the outside diameter of the mandrel on which the strand of shirred casing is compacted. For example, for a typical size of frankfurter casing, it was found that the shirred stick can be doffed from the mandrel having an 0.510 inch outside diameter onto a core having an outside diameter of 0.500 inches.

An example of a tubular core which is able to resist the forces generated by the shirred stick is one made of rigid polyvinyl chloride having an inside or bore diameter of about 0.450 inches and a wall of thickness of about 0.025 inches.

After placement of the core, there is some axial growth of the shirred stick so that a final pack ratio may drop from the original compressed pack ratio of 180 to about 159-160. Also, there may be a reduction of bore size of the core. That is the shirred stick may exert a radial inward force on the core sufficient to cause the inside diameter of the core to decrease from about 0.450 inches to about 0.440 inches.

After the shirred stick is placed on the core, rib 15 and, if desired, rib 19 are formed. These ribs can be cold formed by inserting a tool into the bore of core 12 and then operating the tool to raise the ribs. Neither rib 15 nor rib 19 need be very large to function. For example, with the size core and casing as described herein, a rib 15 about 0.03 inches high will be sufficient to function as a deshirring control means.

The flange 18 is then fixed to the core, as by welding. Preferably, the flange is an injection molded piece provided with the flats 20 prior to the time the flange is fixed to the core.

After the flange is fixed to the core, about 10-14 inches of the casing is deshirred and drawn over the flange. This deshirred casing is then formed into a plug 26 and inserted into the bore of the tubular core as shown in FIG. 2.

Thus, a preferred cored high density casing article of the type shown in FIG. 2, with frankfurter size casing, would contain about 285 feet of casing and measure about 22¾ inches from one end of the core to the other. This is in contrast with a more conventional, i.e. uncored, shirred stick for the same size of casing, which measures about 20½ inches in length and contains only about 160 feet of casing. The bore size of the preferred article of about 0.440 inches would be comparable to the inside diameter of a stuffing horn as may accommodate the more conventional uncored shirred stick.

Figure 3:
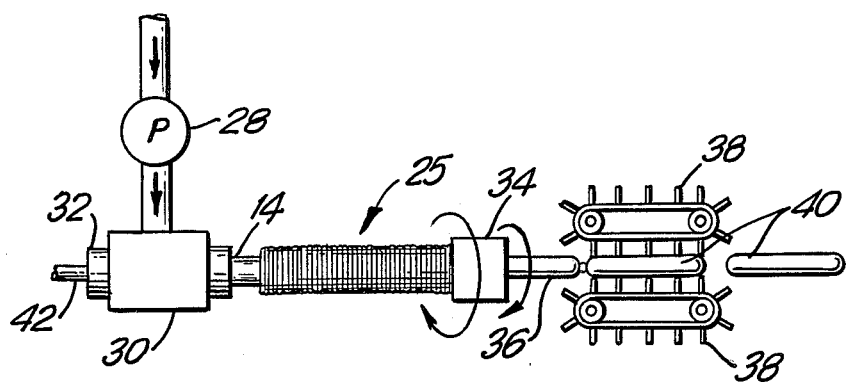

Referring to FIG. 3, there is shown, diagramatically, components of a stuffing machine as may employ the casing article 25 of FIG. 2. The stuffing machine is preferable a type as described in U.S. Pat. No. 3,115,668 for use in the production of frankfurters, or the like. Reference is made to that patent for a more detailed description as to the function and operation of components not herein described.

Briefly, for the purpose of the present invention, it is merely sufficient to say that the machine includes a pump 28 which is connected to a source of food product (not shown). The discharge of the pump is connected to a manifold chamber 30, including a sliding valved conduit 32. This conduit, connected to a rod 42, is one of the components further described hereinbelow.

The sliding conduit 32 is in turn connected to the aft end 14 of the casing article 25 of the present invention.

The fore end of the casing article is received in a chuck 34 which rotates in the direction as indicated by the arrows. This rotating chuck 34 is a further component of the apparatus described hereinbelow. The stuffed casing 36 which exits from the chuck is also rotating in the direction as indicated by arrows. This rotating product is then passed through a linked mechanism indicated at 38 which forms the stuffed product into links 40 in a conventional manner.

Figure 4:
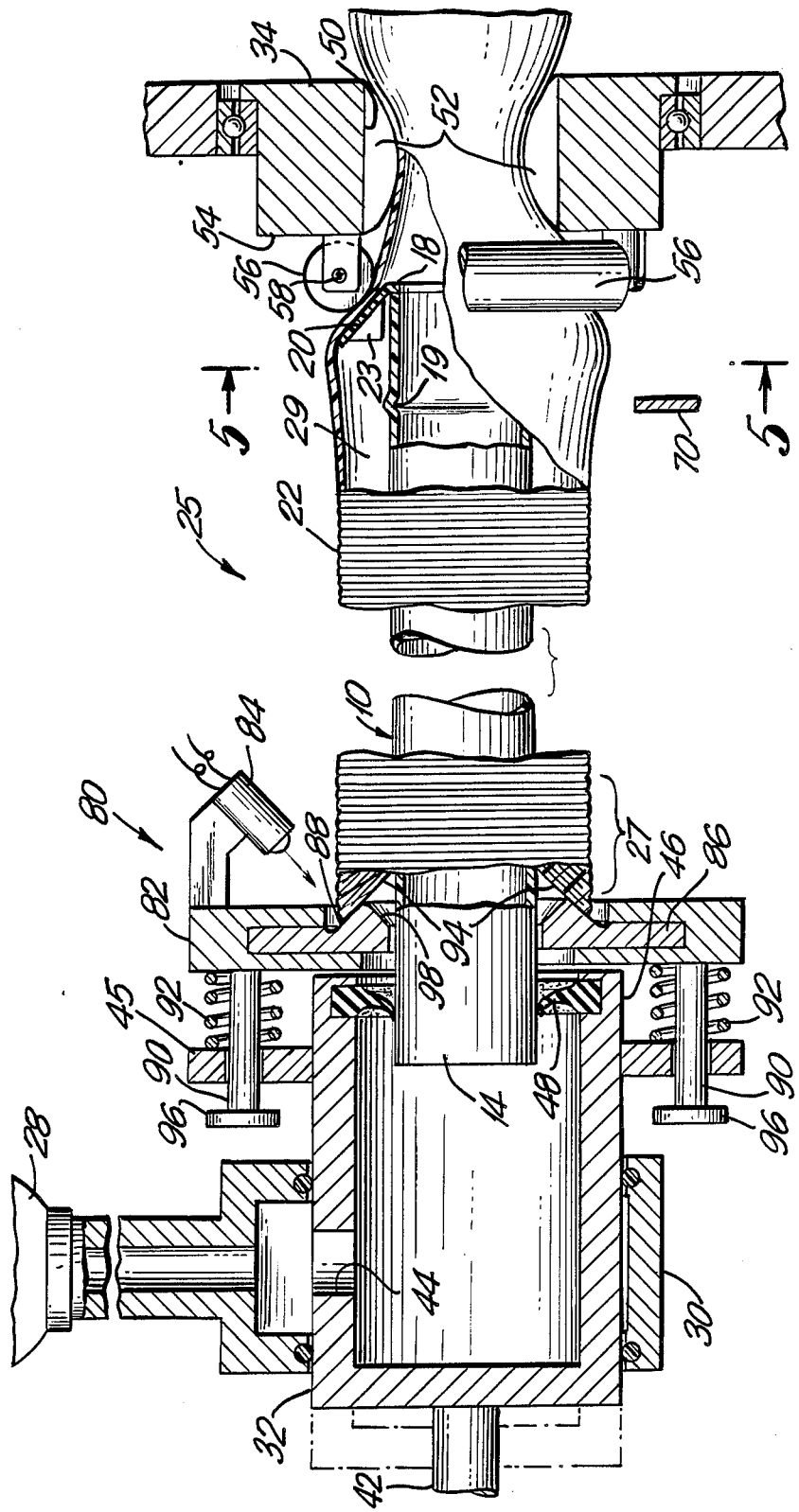
FIG. 4 is a view, partly broken away and in section, showing the cored casing article of the present invention in operative association with components of the stuffing machine shown in FIG. 3.

While not shown in the figures, a carrier means is used to index the cored casing articles towards the stuffing position shown in FIGS. 3 and 4. A preferred carrier means and stuffing apparatus using the core 10 as a disposible stuffing horn is more particularly described and claimed in a copending application Ser. No. 481031 now U.S. Pat. No. 4,489,460 issued Dec. 25, 1984, the disclosure of which is incorporated herein by reference.

For purposes of the present invention, those components for the stuffing apparatus which interface with casing article 25 are described hereinbelow. These components, in particular, include portions of the sliding valved conduit 32 for receiving the aft end 14 of the casing article, and the rotating chuck 34 which is adapted to receive the fore end 16 of the casing article. These components are shown in further detail in FIG. 4-6.

Referring to FIG. 4, the casing article 25 is shown in operative association with components of the stuffing apparatus. In this respect the aft end 14 of core 10 is captured in the discharge end 46 of the sliding valved conduit 32. The conduit 32 is a reciprocating member which is driven by a piston rod 42 connected to any suitable drive means, not shown. The conduit is slidingly carried within manifold 30, the manifold in turn being attached to the discharge of pump 28 as set out hereinabove.

The sliding conduit 32 has an opening 44 in the wall thereof. In the position shown in FIG. 4, the opening aligns with the manifold chamber to permit food product in the manifold 30 to enter the conduit. When the conduit 32 is moved to a position shown in phantom line, in FIG. 4, opening 44 is out of registry with the manifold chamber so that food product cannot pass into the conduit. Thus, sliding conduit 32 functions as a valve to control the flow of food product into the conduit and though its discharge end 46.

The discharge end 46 of the sliding conduit 32 is provided with a gland seal 48. This seal is arranged so that the aft end 14 of the core, when inserted through the discharge end 46 of the conduit 32, will contact and slide across gland seal 48 as shown. With the gland seal 48 disposed about the aft end as shown, food product pumped into conduit 32 through opening 44 will exert sufficient pressure to force the gland against the outer periphery of the tubular core and effect a fluid-tight seal there between.

The gland seal also permits the tubular core 10 to rotate about its longitudinal axis. In this respect the gland seal acts as a bearing to prevent excessive vibration of the aft end during such rotation. If desired, an appropriate bearing means may be provided at the discharge end of the conduit to further accommodate rotation of the casing article 25 about its longitudinal axis.

The drive means for spinning the casing article 25 about its longitudinal axis is provided by rotating chuck 34. Chuck 34 is spaced from and is axially aligned with, the longitudinal axis of sliding conduit 32. Rotation of the chuck is provided by a drive means such as a belt drive or gear train (not shown) which engages about the outer periphery of the chuck. The chuck 34 has a central passage 50 through which the stuffed casing passes and the internal periphery of this passage is provided with a plurality of flutes 52 for engaging the stuffed casing.

Rotating chuck 34 has a face 54 which is generally oriented in a plane perpendicular to the axis of rotation of the chuck. Disposed on this face 54 of the chuck and about opening of passage 50 through this face are a plurality of roller bearings 56. The number of these roller bearings correspond generally to the number of the flats 20 on flange 18.

Figure 5:
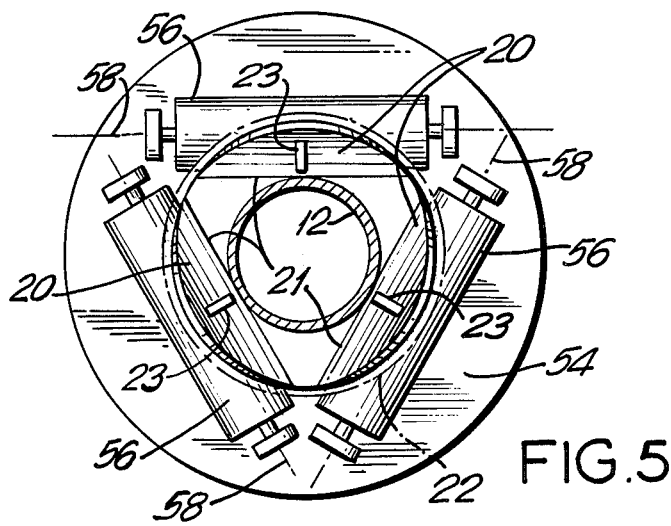
FIG. 5 is a view taken along lines 5—5 of FIG. 4.

These roller bearings 56 are arranged in a symmetrical pattern about the opening of passage 50 through chuck face 54. More specifically, the axis 58 of rotation of each of the roller bearings will generally inscribe this opening of passage 50 when viewed along the axis of rotation of the chuck. As best seen in FIG. 5, this places the roller bearings in a position substantially complimentary to the configuration of the flats 20, wherein the axis of rotation of each roller bearing extends parallel to the plane of a corresponding flat 20.

With this arrangement the roller bearings 56 can nestably receive flange 28 and automatically align the longitudinal axis of the casing article 25 with the rotational axis of chuck 34. In addition, since these roller bearings 56 are each oriented along corresponding flat 20, the roller bearings can act as drive means to transmit the rotation of chuck 34 to the casing article for rotating the casing article about the longitudinal axis of the article.

In addition to being driven by chuck 34 about the rotational axis of the chuck, each rolled bearing 56 is free to rotate about it own longitudinal axis 58. This allows the casing being deshirred from the casing strand 22, to pass longitudinally between the roller bearings and the flats 20 of flange 18. The roller bearings 56, in this aspect, function as antifriction means to allow passage of the casing with relatively low friction in order to prevent binding and possible tearing of the casing at the engagement point of the roller bearings and flange. Making flats 20 of a low friction material, such as polytetrafluroethylene, or providing the flats with a low friction surface finish will also reduce the possibility of the casing binding and tearing as the casing passes over flats 20.

To complete the components of the stuffing machine as described herein. FIG. 4 shows an end-of-casing sensor generally indicated at 80. This sensor includes a carriage 82 which is slidably mounted to a flange 45 on conduit 32 adjacent its discharge end 46. This carriage carries an appropriate sensor 84 such as electric eye sensor.

Preferably, electric eye sensor 84 is a type which emits a beam and then utilizes the reflection of this beam to indicate the presence (or absence) of an object between the eye and a reflector.

Carriage 82 also carries a follower 86 which has a reflecting surface 88. This reflecting surface 88 is set at an angle to the longitudinal axis of the casing and generally normal to the path of a beam eminating from electric eye sensor 84.

The carriage is carried by guide rods 90 which are slidably mounted to flange 45. Springs 92 between the flange and carriage work to bias the carriage in a direction towards the trailing end 94 of casing strand 22 so as to keep the follower butted against the trailing end 94 as shown. Any suitable means such as stops 96 can be used to limit the travel of carriage 82.

If desired, follower 86 can be free to rotate with respect to carriage 82 so as to better accommodate the rotation of the casing article. Otherwise the follower preferably should be made of low friction material to prevent damage to the casing at the trailing end which rubs against the follower.

Of course, any appropriate end-of-casing sensor can be used in place of the electric eye sensor as shown. For example, a micro switch on flange 45 which is operated upon engagement with stop 96 can be used to indicate when the follower 86 has tracked the trailing end of the casing to some predetermined position on the core.

Also, follower 86 can function as a bearing to provide additional support to the aft end 14 of the core during the rotation of the core. The follower, further, has a funnel-shaped opening 98 which assists in directing the aft end of the core into the discharge 46 of conduit 32.

The operation of the stuffing apparatus utilizing the core 10 of the casing article 25 as a desposable stuffing horn now will be described as beginning prior to the time that the casing article is put into stuffig position. At such time, the sliding conduit 32 is in the phantom line position shown in FIG. 4. In this position port 44 is out of alignment with manifold 30 so that the manifold is closed and no food product flows into the conduit A casing article 25 as shown in FIG. 2, is transported by an appropriate means (not shown) from a supply of such articles to a position wherein the longitudinal axis of the article is generally in alignment with the longitudinal axis of the rotating chuck 34 and sliding conduit 32. With casing article 25 in this position, the sliding conduit 32 is moved to the right as viewed in FIG. 4.

As conduit 32 moves to the right, the aft end 14 of the core is funneled through opening 98 and into the discharge end 46 of conduit 32. In this way the conduit picks up the core aft end 14 so gland seal 48 at the conduit discharge can engage and slide over the aft end of the core.

Conduit 32 continues to move towards the right so that the entire casing article 25 now is transported by such movement to the right, as viewed in FIG. 4, until flange 18 abuts against roller bearings 56. Thereafter, continued axial movement of sliding conduit 32 will work to compress spring 92 and will cause the gland seal 48 to slide further over aft end 14.

Moving flange 18 against roller bearings 56 may cause the flats 20 to flex thereby providing a "soft" engagement of the flange against the roller bearings. Stops 23 prevent the flats from flexing to the point of breaking. The stops also limit flexing to prevent the flange from being forced through opening 50 in the chuck.

The movement of conduit 32 also butts follower 86 against the trailing end 94 of the casing strand 22 and a part of this trailing end thereby lies over reflecting surface 88 as shown in FIG. 4.

Rotating chuck 34 is now put into motion, and it will rotate relative to the flange 18 until the roller bearings 56 each become seated against a corresponding flat 20. This seating automatically centers the casing article 25 with respect to the axis of rotation of the rotating chuck 34, and permits the chuck to begin rotating the casing article 25 about its longitudinal axis. Gland 48 at the aft end of the casing article, functions as a rotating seal member about the aft end of the core. In addition, the gland seal 48 and follower 86 work as bearing means to maintain the axial alignment of the core with the rotating chuck 34, and to support the aft end of the core during rotation.

As the sliding conduit 32 moves towards the right, port 44 is eventually put into communication with manifold 30, as shown in solid line in FIG. 4. When this occurs, product flows from the pump into the conduit 32, and from the conduit discharge end 46 directly into the tubular core. As stated hereinabove, the introduction of food product into the conduit 32 exerts a pressure on gland seal 48 to force the gland against the outer surface of the tubular core, thereby effecting a fluid tight seal therebetween. The pressure of the food product also tends to force the casing article 25 to the right, as viewed in FIG. 4, so as to seat flange 18 against roller bearings 56.

As the food product is forced through the tubular core body 12, it unseats plug 26 (FIG. 2) from within the bore. Food product now enters the casing and as the casing fills with food product, the casing deshirrs from the casing supply 22 and exits through the passage 50 in the rotating chuck 34 as shown in FIG. 4.

As the casing deshirrs, it moves longitudinally over the flats 20 of flange 18, and between these flats and the roller bearings 56. Because the casing passes between flats 20 and roller bearings 56, care should be taken not to seat flange 18 against the roller bearing 56 with a force sufficient to pinch the casing between flats 20 and the roller bearings. If this occurs, the casing may tear. Accordingly, by controlling the stuffing pressure and by using roller bearings, the passage of casing over the flats 20 is facilitated and the danager of pinching and tearing the casing is reduced.

The engagement of these roller bearings along the flats 20 also effects a seal to prevent food product from backflowing between these components into the space 29 on the inboard side of flange 18 which is vacated by the deshirring casing. An additional seal is effected by the casing passing over the circular outer periphery of flange 18. In this respect, it has been stated hereinabove that the diameter of the flange 18 is substantially equal to the inflated diameter of the casing with which it is used. It is for the purpose of effecting an emulsion seal between the casing and flange that this dimensional correlation is selected.

The stuffing of casing 22 to produce the encased product, and the subsequent linking of this product continues until the supply of casing contined in strand 22 is exhausted. When this occurs, electric eye sensor 84 issues a signal to indicate the depletion of the casing so that an appropriate control means (not shown) can operate to initiate the shutdown of pump 28.

The presence of rib 15 (FIG. 2) which prevents movement of the shirred anchor portion 27 along the core insures that any movement of the casing trailing end 94 is a true indication of casing run out. Accordingly the movement of this trailing end as sensed by the means as shown or by another appropriate end-of-casing sensor can be relied upon to initiate termination of the stuffing operation.

After pump 28 is shut down, sliding conduit 32 is withdrawn to the phantom line position, as shown in FIG. 4. This withdrawing movement of the conduit 32 will tend to pull the empty core 12 to the left, as viewed in FIG. 4. Accordingly, an appropriate stop such as indicated at 70, moves into position against flange 18 to prevent such motion on the part of the core. With stop 70 in position, the withdrawing movement of conduit 32 causes the aft end 14 of the core to pull free from the gland seal 48 and disengage from the conduit 32. With this disengagement accomplished, the empty tubular core 12 is discarded and a fresh casing article 25 can be placed in position for stuffing.

Figure 6:
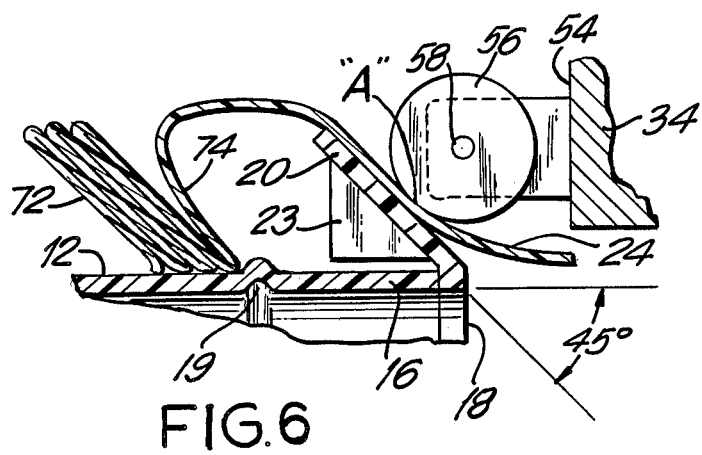
FIG. 6 is a view on an enlarged scale of a portion of FIG. 4.

Reference is now made to FIG. 6 for a further description of the method of deshirring the casing in a direction opposite to the direction in which the casing was shirred, and the operation of roller bearings 56. In the casing article as shown in FIG. 6, the nested cone geometry indicates that a pleat identified at 72 was shirred before the pleat identified at 74. In a conventional stuffing operation, deshirring would proceed in a direction wherein pleat 72 would deshirr first.

When the casing strand is engaged about a core, as shown in FIG. 6, and especially in a highly compacted casing as described above, pleats 72 may be pinched to the core by the overlying adjacent pleat. Deshirring of an underlying pleat 72 in a conventional manner requires that this pleat be pulled out from under an overlying, or next adjacent, pleat while the overlying pleat is pinching the underlying pleat against the core. Thus, pulling on pleat 72 to effect the deshirring may result in this pleat tearing at the core surface.

In contrast, deshirring in a direction which is opposite to the conventional manner, that is, deshirring pleat 74 first, allows each overlying pleat to deshirr before each adjacent underlying pleat. With the overlying pleats removed first, each uncovered underlying pleat is then easily moved from against core 12.

FIG. 6 also shows the preferred engaging relationship between roller bearings 56 and the corresponding flat 20 of flange 18. In this respect it has been found that the flange portion is preferably bent rearward at an angle of approximately 45 degrees to the core axis. Likewise, the nip line indicated at "A" between the roller bearings and flanged portion should be approximately 45 degrees from the core axis.

It has been found that this relationship provides n optimum area of contact so that the roller bearings may drive tubular core 12 about its lingitudinal axis while at the same time offering the least resistance to the passage of deshirred casing 24 between the flange and the roller bearing.

Thus, it should be appreciated that the present invention provides a novel casing article including a disposable, one use core member and a casing strand carried on the core. This core improves the resistance of the casing strand to breakage when subjected to the rigors of both manual handling and handling by an automatic stuffing apparatus.

The disposable core can be utilized as the stuffing horn and rotated as disclosed herein, or the casing article can be located over a stuffing horn wherein the horn extends through the tubular core. When the casing article is used with a stuffing horn, only the drive component of the apparatus, i.e. rotating chuck 34 must be adapted to interface with the casing article. Also, when used over a stuffing horn there is less likelihood that the stuffing pressure will cause pinching of the casing between flats 20 and roller bearing 56. In either event, the core would be a disposable, one use item.

The core member of the present invention has an engagement means on the fore end 16. As described hereinabove, the engagement means is flange 18 including its component elements 20, 21 and 23. Those skilled in the art will understand that the engagement means could have an alternate configuration. For example, a functional equivalent of flange 18 is a flared, flattened or belled end at the fore end 16 which is configured to provide for nesting engagement with rollers 56 of chuck 34.

Also disclosed is apparatus for utilizing the novel casing article in the automatic production of encased products such as frankfurters and the like. In this respect the apparatus provides a novel drive chuck for engaging, centering, and spinning the cored casing article about its longitudinal axis. It also provides the necessary seal means at both the fore and aft ends of the casing article, which allow the introduction of food product into the core, and from the core into the casing.

The spring biased end-of-casing sensor as disclosed herein, is self adjusting in that it automatically locates the fixes on the trailing end of the casing when the casing article is mounted to the stuffing apparatus. The spring bias maintains the sensor against the trailing end of the casing and allows the sensor to track this trailing end. With this arrangement any premature movement of the trailing end along the core will not initiate a shutdown of the stuffing operation. Instead, shutdown is initiated only when the trailing end is removed from over the reflecting surface. This occurs only upon the substantially complete deshirring of the trailing end of the strand.

Having thus described the invention in detail, what is claimed as new is:

1. An elongated substantially straight cylindrical tubular core having fore and aft ends and a longitudinal bore forming a passage for foodstuff through the tubular core and into a food casing drawn forward over the core fore end from a casing supply disposed on the tubular core, said tubular core further comprising:
   (a) a flange extending radially from and circumferentially about said fore end in a plane oriented transverse and generally perpendicular to the longitudinal axis of said tubular core, said flange being of a size to accommodate passage of casing over and about said flange during stuffing;
   (b) a rotatably drivable part on said flange to rotate said tubular core about its longitudinal axis, said drivable part having at least one surface for bearing in pressable driving engagement against a driving element rotatable about said axis; and
   (c) said surface having receivable thereagainst casing which is pressed against said surface by the driving element as the casing is drawn over and about said flange during stuffing and rotation.

2. A tubular core as in claim 1 wherein said flange is generally circular and has a diameter substantially equal to the inflated diameter of the casing carried by said core.

3. A tubular core as in claim 1 wherein said flange is generally circular and said drivable part comprises flats formed from peripheral portions of said flange, said flats being bent from the plane of said flange in a direction towards said aft end.

4. A tubular core as in claim 3 wherein said peripheral portions are defined by chords of said circular flange which aresubstntially equal in length.

5. A tubular core as in claim 4 including three of said flats equally spaced about the periphery of said flange.

6. A tubular core as in claim 3 wherein said flats can flex with respect to the plane of said flange.

7. A tubular core as in claim 3 wherein said flats are disposed at an angle of about 45° with respect to the longitudinal axis of said tubular core.

8. A tubular core as in claim 1 further including a shirred casing stand disposed on said core and arranged for deshirring towrds said fore end and over said flange, said casing strand and core being in sufficient gripping contact to resist relative motion therebetween for the corotation of said core and said casing strand about the longitudinal axis of said tubular core.

9. A tubular core as in claim 8 wherein said shirred casing strand disposed on said tubular core has pleats forming generally a nested cone configuration in cross section wherein any given pleat intermediate the ends of said strand lies between an overlying pleat and an underlying pleat of said nested cone configuration, said strand being arranged on said core for deshirring over said flange such that each overlying pleat is deshirred prior to the next adjacent underlying pleat.

10. A tubular core as in claim 8 wherein an unshirred portion of said casing is arranged over said flange and forms a plug of casing material releasably positioned within the fore end of said longitudinal bore.

11. A tubular core as in claim 8 having adjacent its aft end a surface projection extending outward from said tubular core and into an aft end portion of said shirred casing strand, said projection restraining the longitudinal movement of said casing strand aft end portion along said tubular core responsive to the deshirring of casing from said strand during stuffing.

12. A tubular core as in claim 8 having an outward extending surface projection between said flange and the fore end of said shirred casing strand, said projection providing a stop means for preventing longitudinal movement of said shirred casing strand along said tubular core and against said flange.

13. A cored casing article for use in the production of encased food products such as frankfurters and the like, said article comprising:
   (a) a substantially rigid tubular core having an aft end and a fore end;
   (b) a flange on said fore end oriented in a plane generally perpendicular to the longitudinal axis of said core;
   (c) a shirred casing strand on said core arranged for deshirring in a direction towards the fore end and over said flange, said strand and core being in sufficient contact over the length of said strand to resist relative motion therebetween;
   (d) said casing strand having an unshirred portion extending over said flange and forming a plug of casing material disposed within the bore of said tubular core at said fore end; and
   (e) means on said flange for receiving a rotary drive member thereagainst to rotate said casing article about said longitudinal axis.

14. A cored casing article as in claim 13 wherein said shirred strand has a pack ratio of about 160 and contains about 285 feet of a cellulosic tubular casing having a moisture content of at least about 13% by weight, the inside diameter of said core being of a size sufficient to accommodate the passage of food product for stuffing said casing.

15. A cored casing article as in claim 13 including restraining means on said core engaging said shirred strand for restraining a shirred portion of said strand lying between said restraining means and core aft end from moving longitudinally along said core responsive to the deshirring of casing from said strand.

16. A cored casing article as in claim 13 wherein said flange is generally circular and said means comprises peripherial portions of said flange which are bent out of the plane of said flange and towards said aft end, said portions defining flats for receiving a rotary drive member thereagainst.

17. An elongated substantially rigid tubular core attachable to a stuffing machine as a stuffing horn and capable of supporting a supply of shirred casing disposed on the tubular core prior to its attachment to the stuffing machine, said tubular core comprising:
   (a) an aft end releaseably connectable in communication with a food product discharge outlet of a stuffing machine;
   (b) a fore end about which casing from the supply is drawn for stuffing;
   (c) a rotatable driveable means on and about the outer periphery of said fore end which is engageable by a rotary drive member of the stuffing machine for rotating said tubular core and its supply of shirred casing about the longitudinal axis of said tubular core; and
   (d) said rotatably drivable means having at least one driven surface against which casing is pressed upon engagement of said surface with the rotary drive member of the stuffing machine as the tubular core is rotated about its longitudinal axis and as the casing is drawn over said surface during stuffing.

18. A core as in claim 17, wherein said drivable means comprises configured portions formed about the outer periphery of said fore end, said configured portions being complimentary to the rotary drive member of the stuffing machine.

19. A core, as in claim 17, including a flange on said fore end, said drivable means being incorporated into said flange.

20. A core as in claim 19 wherein said flange is oriented in a plane generally perpendicular to the longitudinal axis of said core and said drivable means is disposed about the outer periphery of said flange.

21. A core as in claim 20, wherein said drivable means comprise flats formed from peripheral portions of said flange, said flats being bent from the plane of said flange towards said aft end.

* * * * *